No. 731,885. PATENTED JUNE 23, 1903.
J. F. GEGENHEIMER.
MACHINE FOR MANUFACTURING GLASSWARE.
APPLICATION FILED JULY 16, 1902.
NO MODEL. 3 SHEETS—SHEET 3.
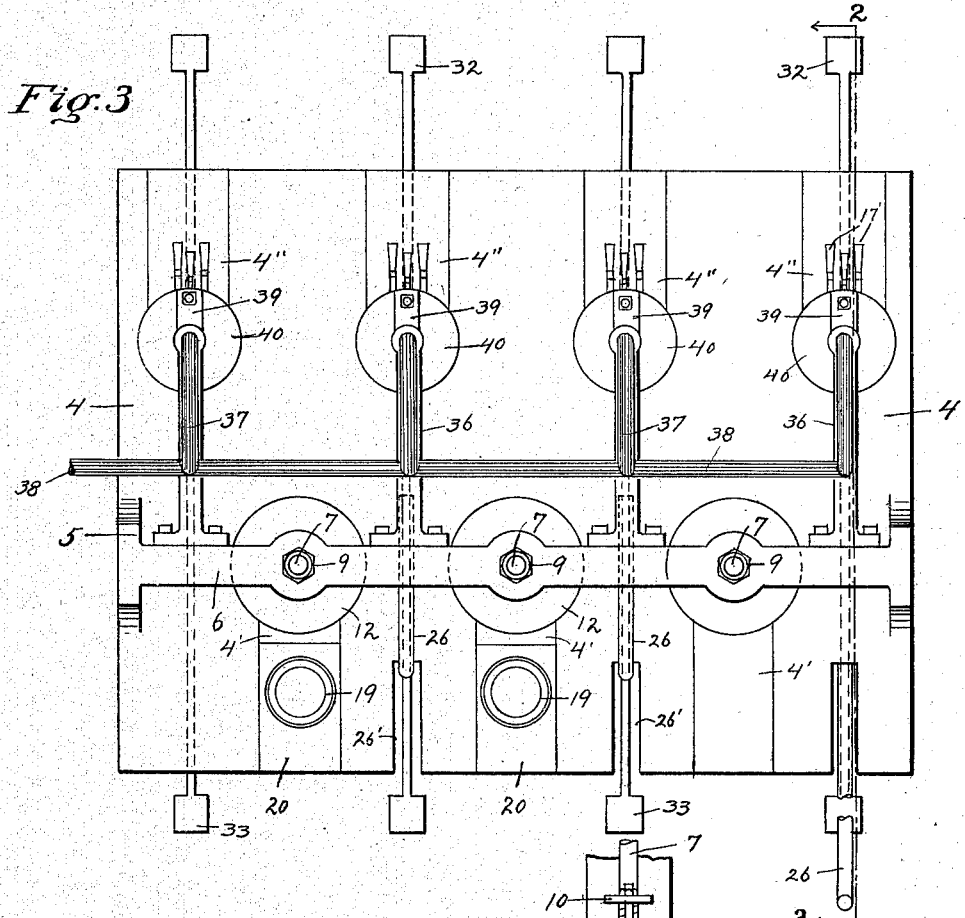
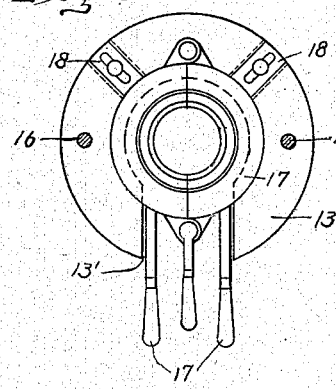
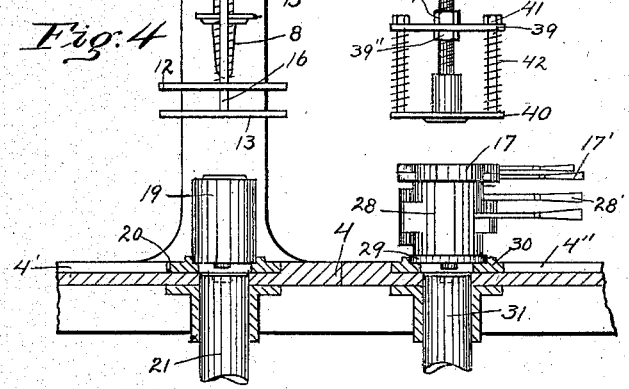

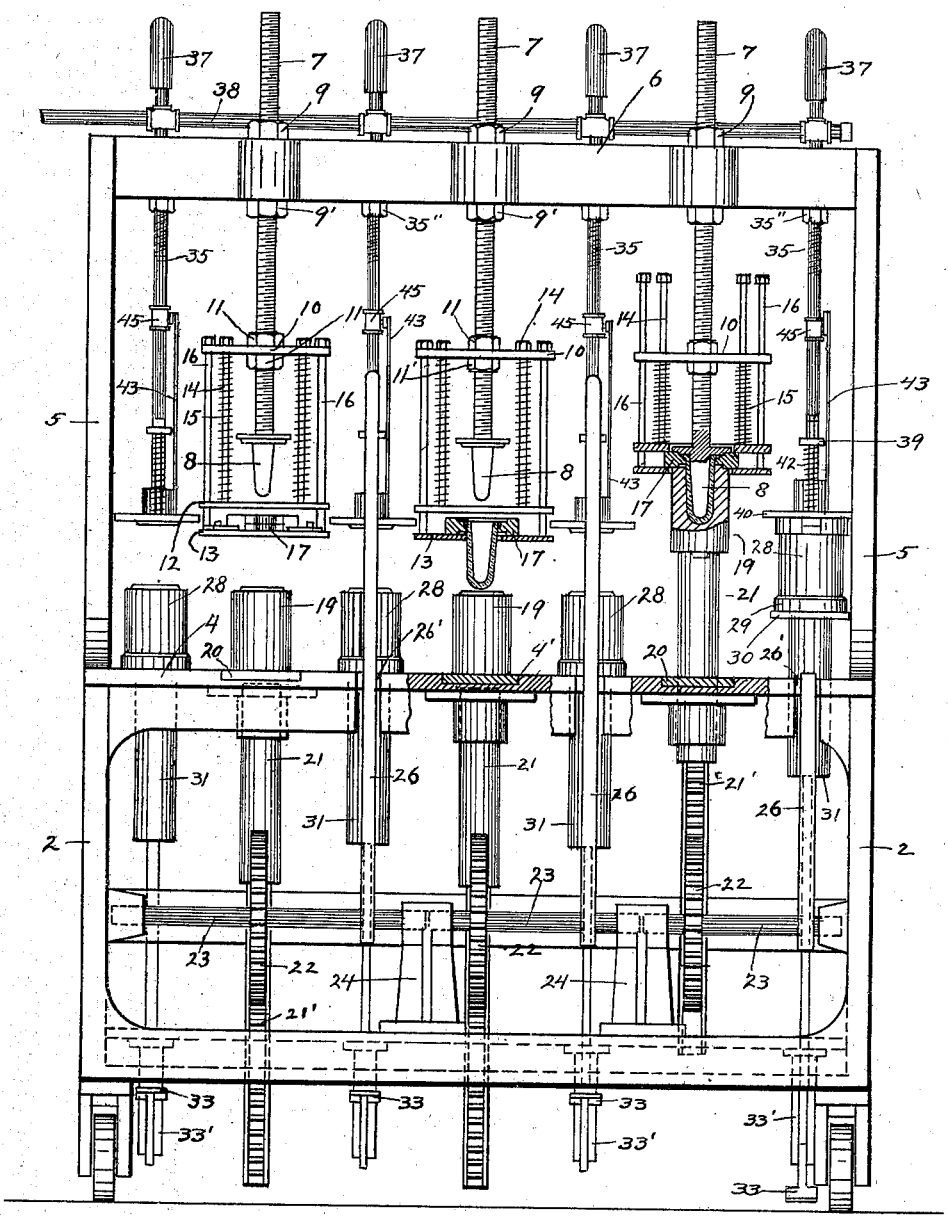

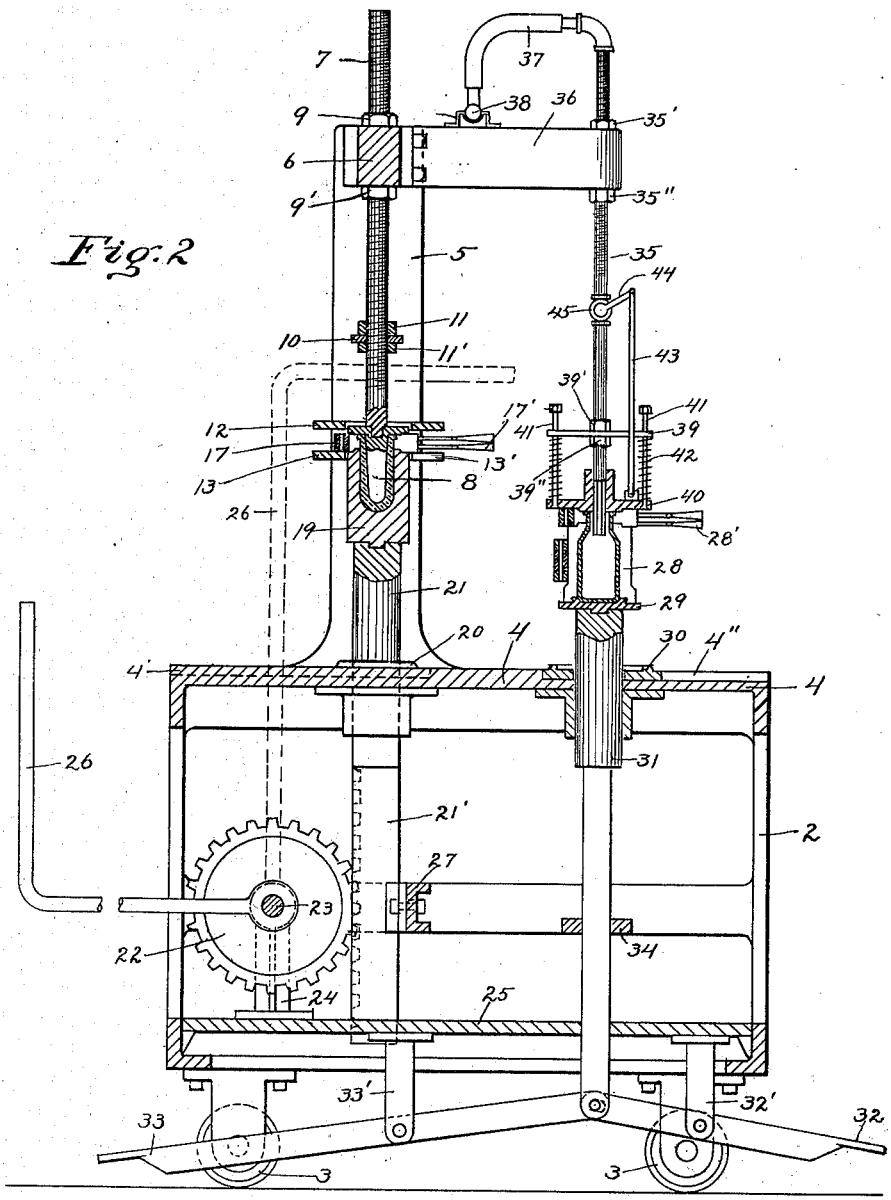

No. 731,885.

Patented June 23, 1903.

UNITED STATES PATENT OFFICE.

JOHN F. GEGENHEIMER, OF GLASSBORO, NEW JERSEY.

MACHINE FOR MANUFACTURING GLASSWARE.

SPECIFICATION forming part of Letters Patent No. 731,885, dated June 23, 1903.

Application filed July 16, 1902. Serial No. 115,770. (No model.)

*To all whom it may concern:*

Be it known that I, JOHN F. GEGENHEIMER, a citizen of the United States, residing at Glassboro, in the county of Gloucester and State of New Jersey, have invented certain new and useful Improvements in Machines for Manufacturing Glassware, of which the following is a specification, reference being had therein to the accompanying drawings.

This invention relates to machines for the manufacture of wide and narrow neck jars, bottles, and other glass articles, and the primary object thereof is to simplify and improve that type of machine wherein the blank is first pressed in a portable mold to form the neck of the article and then transferred to a blow-mold for completing the same by suitable automatic blowing mechanism.

The invention embodies vertically-fixed pressing and blowing mechanisms, which coöperate with means for raising the molds thereto for effecting the pressing and blowing operations.

Further, the invention embodies a presser-head of improved form for holding the neck-mold during the pressing operation, sliding supports for the press-molds, whereby they may be more conveniently reached for depositing the molten glass therein, and laterally-swinging supports for the blowing mechanism, whereby the same may be moved to one side and out of the way for removing the finished article from the blow-mold.

In the accompanying drawings, Figure 1 is a side elevation, partly in section, of a machine constructed in accordance with my invention, one of the press-molds being shown raised to pressing position. Fig. 2 is a vertical cross-sectional view on line 2 2 of Fig. 3, showing both the press and blow molds in section and raised to operative position. Fig. 3 is a plan view. Fig. 4 is a view of opposite press and blow molds similar to those shown in Fig. 2, the molds being lowered to position on the table. Fig. 5 is a detailed view of a portion of the pressing-head which holds the neck-mold during the pressing operation.

Referring to the drawings, 2 designates the upright portion of the machine-frame, 3 the floor-wheels upon which the same is mounted, and 4 the top or table. From opposite ends of this table rise the standards 5, which support at their upper ends the transverse bar or beam 6. Extending vertically through this bar are the threaded rods 7, carrying at their lower ends pressing-plungers 8, said rods being maintained at desired elevation by nuts 9 and 9' above and below beam 6.

Supported on each of rods 7 is a presser-head, which consists of plate 10, adjustably secured on the rod by nuts 11 and 11', and the plates 12 and 13. Said plates are formed with central openings, through which the plunger projects, and plate 12 is suspended from plate 10 by bolts 14, which are freely movable therethrough, with springs 15 on the bolts intermediate plates 10 and 12 for resisting upward movement of the latter. The lowermost plate 13 is suspended on bolts 16, which move freely through plates 12 and 10.

17 is a sectional neck-mold adapted to be positioned between plates 12 and 13 and held properly centered on the latter by radially-adjustable guides 18, the sections of said mold being hinged together, as usual, and having operating-handles 17'. Plate 13 is open on the side adjacent the blowing apparatus, as indicated at 13', whereby the mold carrying the pressed blank may be removed from the pressing-head and placed in position for blowing, as will be presently described.

19 is the press-mold, adapted to seat in the open-bottom slide 20, said slide being movable in depression 4' in table 4, whereby the mold may be drawn to the table edge for receiving a fresh charge of glass. Movable vertically through the table and slide and adapted to engage the bottom of mold 19 and form a support therefor is lifting-bar 21, provided at its lower end with rack 21', and meshing therewith is gear-wheel 22 on shaft 23, the latter being journaled in bearing-posts 24, rising from horizontal plate 25 in frame 2 and carrying the operating-lever 26, movable in table-slot 26', whereby when said shaft is oscillated bar 21 is moved vertically and with it mold 19, the bar being guided by plate 25 and cross-bar 27. The press-mold forms a tight union with the under side of neck-mold 17, and upward movement of the latter being resisted by spring-plate 12 bearing thereagainst the molds are held tightly together while moving upward around plunger 8, thus preventing the glass from being forced therebetween during the operation of pressing the neck of the article.

Upon completion thereof the press-mold is lowered to its slide 20, leaving the pressed blank suspended in the neck-mold, as shown in the center of Fig. 1.

At the side of table 4 opposite the press-molds are blow-molds 28, and presser-head plates 13 being open toward the blow-molds at 13' the neck-molds carrying the pressed blanks may be readily withdrawn from the presser-heads and positioned on the blow-molds. The latter are each formed of hinged sections having the usual operating-handles 28'. The mold-bottom 29 is adapted to seat in the vertically-apertured slide 30 in table-top depression 4" and over a vertical opening through which operates the lifting-bar 31, adapted at its upper end to engage the mold-bottom and at its lower end provided with the oppositely-extending treadles 32 and 33, fulcrumed on hangers 32' and 33', respectively, depending from frame-plate 25. By this means the blow-mold carrying the neck-mold and pressed blank may be elevated from either side of the machine for the blowing operation. Lifting-bars 31 extend through and are guided by the frame crossbar 34 and horizontal plate 25.

The blowing mechanism consists of threaded pipe 35, adjustable vertically through bracket 36 by means of nuts 35' and 35", the bracket being secured to and projecting laterally from beam 6. A section of hose 37 connects the upper end of pipe 35 with manifold 38, to which air under pressure may be supplied from any suitable source.

The blowing-head consists of plate 39, adjustably held on threaded pipe 35 by nuts 39' and 39", and neck-mold cover 40, which is movable vertically over the lower end of the blowpipe, said cover carrying upwardly-extending bolts 41, movable freely through plate 39, with springs 42, confined on the bolts between plate 39 and cover 40, for resisting upward movement of the latter.

With the blank-carrying neck-mold in position on the blow-mold the latter is raised in the manner above described, forcing upward mold-cover 40, which closely fits the upper face of the neck-mold and is held in tight engagement therewith by springs 42, thereby effecting an air-tight union. Movable vertically with mold-cover 40 is link 43, pivoted thereto at its lower end and at its upper end pivotally connected to operating-stem 44 of blowpipe-valve 45, whereby the air is turned on automatically for the blowing operation and shut off when the mold is lowered at the completion thereof.

With the press and blow molds slidable toward the outer edges of the table they are within easy reach of the operators, and when the slide-carrying molds are moved back as far as possible they are accurately positioned and centered for the pressing and blowing operations, and while the taking-out boy on the blowing side of the machine is transferring a neck-mold and its pressed blank from a pressing-head to a blow-mold and effecting the blowing operation, as above described, a fresh blank is being pressed, the independent pressing and blowing mechanism permitting of a practically continuous operation. While the invention is not restricted as regards the number of such mechanisms on a single machine, I prefer to provide the same with three press-molds and four blow-molds, which will permit of rapid work without any of the molds becoming overheated.

I claim—

1. The combination of a support, laterally-adjacent series of pressing and blowing mechanisms, the pressing mechanisms being spaced apart and the blowing mechanisms spaced apart and opposite the intervals between the pressing mechanisms, whereby between adjacent blowing mechanisms access may be had to a pressing mechanism, substantially as described.

2. The combination of a press-mold, a plunger, a neck-mold, and a laterally-open vertically-movable presser-head adapted to form a support for the neck-mold, substantially as described.

3. The combination of a press-mold, a plunger, a vertically-movable presser-head having two horizontal members arranged one above the other and movable toward each other and having openings through which the plunger operates, the lowermost member being open laterally at 13', and a neck-mold between and confined by said members during the pressing operation, substantially as described.

4. The combination of a table, an elevated support thereon, pressing-plungers suspended in fixed position on the support, brackets extending laterally from the support, blowing mechanisms supported by said brackets, press and blow molds, means for vertically moving the molds, and a neck-mold adapted to coöperate with the press and blow molds, substantially as described.

5. The combination of a plunger, a press-mold, a slotted table, a mold-lifting bar movable through the table and carrying a rack, a gear-wheel journaled beneath the table and meshing with the rack, and an actuating-lever adapted to move in the table-slot when oscillating the gear-wheel, substantially as described.

6. The combination of a blow-mold, a blowpipe, a valve in the pipe, a blowing-head at the extremity of the pipe and movable thereon, and link 43 outside the pipe and blowhead and operatively connecting the latter and said valve, substantially as described.

In testimony whereof I affix my signature in presence of two witnesses.

JOHN F. GEGENHEIMER.

Witnesses:
HARRY HEELER,
CHARLES DERAULT.